(12) United States Patent
 Ooba

(10) Patent No.: US 10,791,227 B2
(45) Date of Patent: *Sep. 29, 2020

(54) IMAGE FORMING APPARATUS THAT CARRIES OUT COMMUNICATION WITH MULTIPLE EXTERNAL APPARATUSES, CONTROL METHOD FOR THE IMAGE FORMING APPARATUS, AND STORAGE MEDIUM

(71) Applicant: CANON KABUSHIKI KAISHA, Tokyo (JP)

(72) Inventor: Hideaki Ooba, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,848

(22) Filed: Jul. 17, 2019

(65) Prior Publication Data

US 2019/0342459 A1 Nov. 7, 2019

Related U.S. Application Data

(63) Continuation of application No. 15/134,682, filed on Apr. 21, 2016, now Pat. No. 10,404,869.

(30) Foreign Application Priority Data

Apr. 22, 2015 (JP) ................................ 2015-087664
Feb. 24, 2016 (JP) ................................ 2016-032961

(51) Int. Cl.
*G06F 3/12* (2006.01)
*H04N 1/00* (2006.01)

(52) U.S. Cl.
CPC ..... *H04N 1/00127* (2013.01); *H04N 1/00347* (2013.01)

(58) Field of Classification Search
CPC . G06F 3/1231; G06F 3/1236; H04N 1/00127; H04N 1/00347; H04N 2201/0034
See application file for complete search history.

(56) References Cited

U.S. PATENT DOCUMENTS 8,386,748 B2 2/2013 Petolino, Jr.
8,769,064 B2 7/2014 Won et al.
(Continued)

FOREIGN PATENT DOCUMENTS

CN 1848788 A 10/2006
CN 101304388 A 11/2008
(Continued)

OTHER PUBLICATIONS

Office Action issued in Korean Appln. No. 10-2016-0046710 dated May 28, 2018.
(Continued)

*Primary Examiner* — Kent Yip
(74) *Attorney, Agent, or Firm* — Rossi, Kimms & McDowell LLP

(57) ABSTRACT

An image forming apparatus determines whether a network address of a first IP address used in a wireless communication with a first external apparatus conflicts with a network address of a second IP address used in communication with the second external apparatus. A predetermined process is executed at least in a case where it is determined that the network address of the first IP address conflicts with the network address of the second IP address.

8 Claims, 10 Drawing Sheets

(56) References Cited

U.S. PATENT DOCUMENTS

| | | |
|---|---|---|
| 8,896,874 B2 | 11/2014 | Inoue |
| 8,976,391 B2 | 3/2015 | Nanaumi |
| 2004/0122974 A1 | 6/2004 | Murakami |
| 2010/0103457 A1 | 4/2010 | Nakamura |
| 2010/0211659 A1 | 8/2010 | Chen et al. |
| 2012/0131197 A1 | 5/2012 | Prentice et al. |
| 2014/0085666 A1 | 3/2014 | Park |
| 2016/0191723 A1 | 6/2016 | Yue et al. |

FOREIGN PATENT DOCUMENTS

| | | | |
|---|---|---|---|
| CN | 102281333 A | 12/2011 | |
| CN | 102597971 A | 7/2012 | |
| CN | 104053194 A | 9/2014 | |
| JP | 2013205982 A | 10/2013 | |
| KR | 1020120064314 A | 6/2012 | |
| KR | 101324923 B1 | 11/2013 | |
| TW | 201032555 A | 9/2010 | |

OTHER PUBLICATIONS

Office Action issued in Chinese Appln. No. 201610251978.4 dated Jul. 3, 2018. English Translation provided.

Office Action issued in Chinese Appln. No. 201610251978.4 dated Jan. 21, 2019. English translation provided.

Office Action issued in Korean Appln. No. 10-2016-0046710 dated Mar. 28, 2019.

Notice of Allowance issued in U.S. Appl. No. 15/134,682 dated Apr. 13, 2017.

Office Action issued in U.S. Appl. No. 15/134,682 dated Sep. 21, 2017.

Office Action issued in U.S. Appl. No. 15/134,682 dated May 2, 2018.

Office Action issued in U.S. Appl. No. 15/134,682 dated Oct. 3, 2018.

Notice of Allowance issued in U.S. Appl. No. 15/134,682 dated Apr. 22, 2019.

IMAGE FORMING APPARATUS THAT CARRIES OUT COMMUNICATION WITH MULTIPLE EXTERNAL APPARATUSES, CONTROL METHOD FOR THE IMAGE FORMING APPARATUS, AND STORAGE MEDIUM

BACKGROUND OF THE INVENTION

Field of the Invention

The present invention relates to an image forming apparatus, a control method for the image forming apparatus, and a storage medium.

Description of the Related Art

Conventionally, there is known an image forming apparatus which carries out communication with a plurality of external apparatuses such as a mobile terminal, a client PC, and a DHCP server (see, for example, Japanese Laid-Open Patent Publication (Kokai) No. 2013-205982). This image forming apparatus is connected to the mobile terminal by a wireless LAN and also connected to the client PC and the DHCP server by a wired LAN via a LAN cable. When carrying out wireless LAN communication with the mobile terminal, the image forming apparatus itself acts as an access point and automatically issues an IP address for use in wireless LAN communication with the mobile terminal. As a result, the image forming apparatus carries out wireless LAN communication with the mobile terminal using Wi-Fi Direct (registered trademark), Bluetooth (registered trademark), or the like. The image forming apparatus also carries out wired LAN communication with the client PC using an IP address issued by the DHCP server.

Each of IP addresses for use in communication between the image forming apparatus and the mobile terminal and communication between the image forming apparatus and the client PC is comprised of a network address and a host address.

However, a network address of an IP address for use in wireless LAN communication between the image forming apparatus and the mobile terminal and a network address of an IP address for use in wired LAN communication between the image forming apparatus and the client PC may conflict with each other. As a result, both wireless LAN communication between the image forming apparatus and the mobile terminal and wired LAN communication between the image forming apparatus and the client PC may be possible. In this case, for example, if a communication setting that gives higher priority to wireless LAN communication between the image forming apparatus and the mobile terminal than to wired LAN communication between the image forming apparatus and the client PC is made in advance, wireless LAN communication between the image forming apparatus and the mobile terminal is carried out. Thus, even when a user wishes transmission of data from the image forming apparatus to the client PC, the data is transmitted to the mobile terminal and hence cannot be transmitted to the client PC to which transmission of the data is wished by the user. Namely, when the image forming apparatus carries out LAN communications with a plurality of external apparatuses, a problem arises when a plurality of IP addresses for use in the respective LAN communications conflict with one another because it is impossible to properly carry out the LAN communications with the plurality of external apparatuses.

SUMMARY OF THE INVENTION

The present invention provides an image forming apparatus which is capable of properly carrying out communication with a plurality of external apparatuses, a control method for the image forming apparatus, and a storage medium.

Accordingly, the present invention provides an image forming apparatus comprising a wireless communicator that performs wireless communication with a first external apparatus, a network I/F that connects a printing control apparatus which communicates with a second external apparatus on a network to the image forming apparatus, a memory that stores programs, and a processor that executes the programs to: determine whether a network address of a first IP address used in the wireless communication with the first external apparatus conflicts with a network address of a second IP address used in communication with the second external apparatus, and execute a predetermined process at least in a case where it is determined that the network address of the first IP address conflicts with the network address of the second IP address.

According to the present invention, communication is properly carried out with the plurality of external apparatuses.

Further features of the present invention will become apparent from the following description of exemplary embodiments (with reference to the attached drawings).

BRIEF DESCRIPTION OF THE DRAWINGS

FIGS. 1A and 1B are conceptual diagrams schematically showing arrangements of image forming systems including an MFP which is an image forming apparatus according to an embodiment of the present invention, in which FIG. 1A shows the image forming system including no EFI that is a printing control apparatus, and FIG. 1B shows the image forming system including the EFI.

FIGS. 2A and 2B are block diagrams schematically showing internal arrangements of some component elements of the image forming system in FIGS. 1A and 1B, in which FIG. 2A is a block diagram schematically showing an internal arrangement of the MFP in the image forming system in FIG. 1A, and FIG. 2B is a block diagram schematically showing internal arrangements of the MFP and the EFI in the image forming system in FIG. 1B.

DESCRIPTION OF THE EMBODIMENTS

Hereafter, an embodiment of the present invention will be described in detail with reference to the drawings.

Figure 1A:
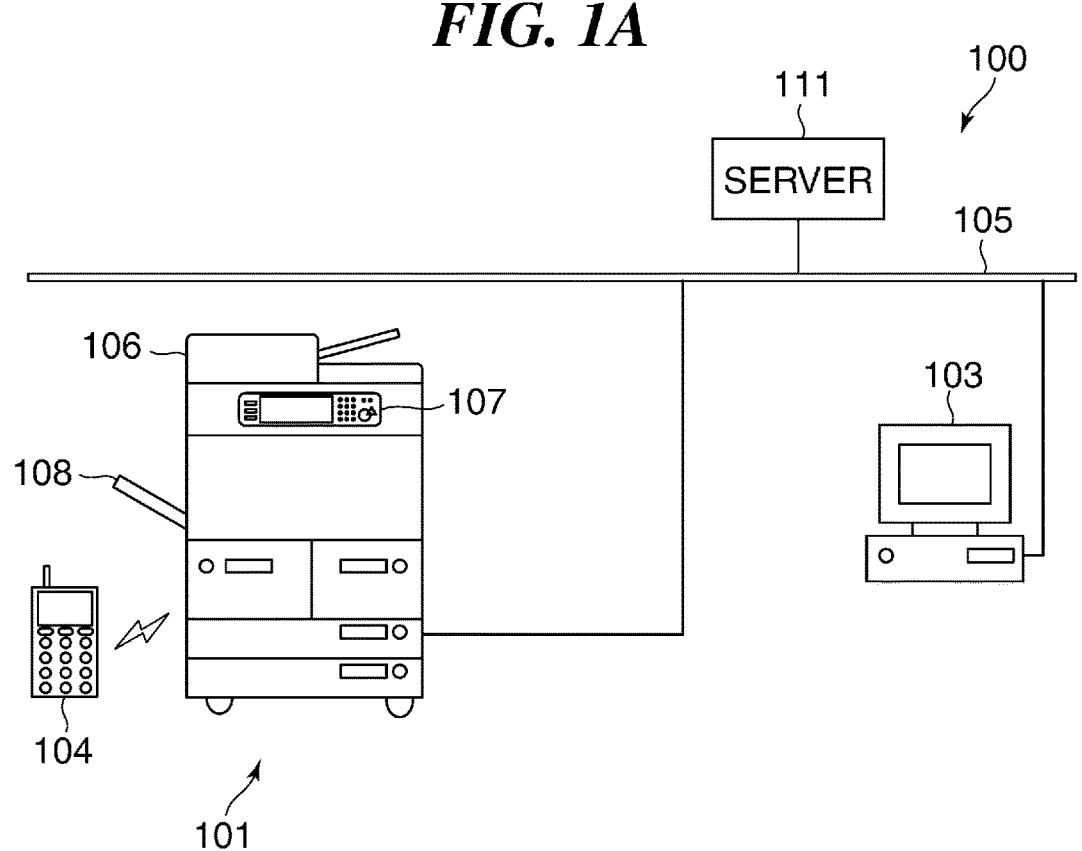
Figure 1B:
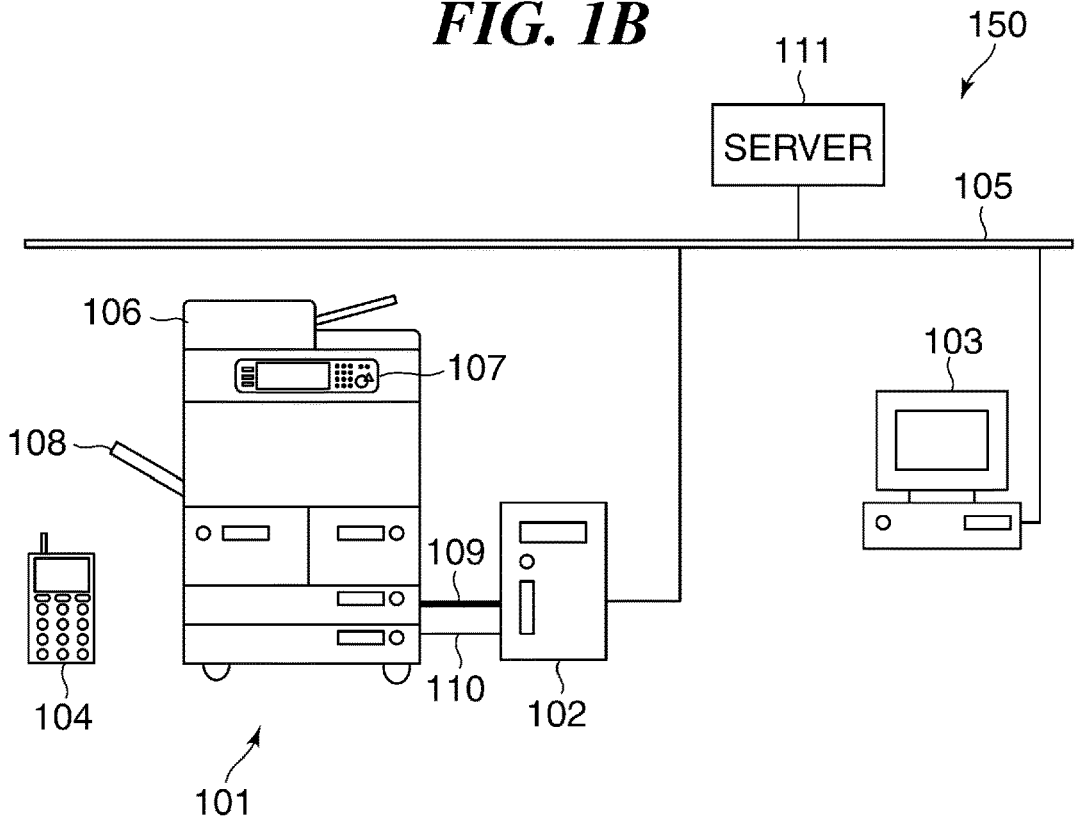

FIGS. 1A and 1B are conceptual diagrams schematically showing arrangements of image forming systems including an MFP 101 which is an image forming apparatus according to an embodiment of the present invention, in which FIG. 1A shows an image forming system 100 including no EFI (registered trademark) 102 which is a printing control apparatus, and FIG. 1B shows an image forming system 150 including the EFI 102.

The image forming system 100 in FIG. 1A has an MFP 101, a client PC 103 (first external apparatus), a mobile terminal 104 (second external apparatus), and a server 111. The MFP 101, the client PC 103, and the server 111 are connected to one another by a wired LAN 105. The server 111 issues an IP address for use in wired LAN communication, and the MFP 101 carries out wired LAN communication using this IP address. The MFP 101 is connected to the mobile terminal 104 by a wireless LAN using, for example, a Wi-Fi Direct or Bluetooth without involving a relay device which acts as an access point. In the present embodiment, the MFP 101 acts as an access point and automatically issues an IP address for use in wireless LAN communication with the mobile terminal 104 to carry out wireless LAN communication.

The image forming system 150 in FIG. 1B has the MFP 101, the EFI 102 (third external apparatus), the client PC 103, the mobile terminal 104, and the server 111. The EFI 102 is placed between the MFP 101 and the client PC 103, and the MFP 101 is connected to the EFI 102 via an image video cable 109 and a control cable 110. The EFI 102, the client PC 103, and the server 111 are connected to one another via the wired LAN 105. It should be noted that as with the image forming system 100, the MFP 101 is connected to the mobile terminal 104 by a wireless LAN.

The MFP 101 has a scanner 106, an operation display unit 107, and a sheet discharging unit 108. The scanner 106 reads an original to generate image data. The generated image data is transmitted to, for example, the client PC 103. The operation display unit 107 receives instructions from a user and displays, for example, status information on the MFP 101. The operation display unit 107 also displays an access point setting screen 900 and produces a warning indication 910 (requesting unit) as will be described later. Recording sheets with images printed thereon are discharged onto the sheet discharging unit 108. The EFI 102 works in cooperation with the MFP 101 to perform various types of image processing on image data. The client PC 103 carries out wired LAN communications and sends print jobs to, for example, the MFP 101. The mobile terminal 104 carries out wireless LAN communications and sends print jobs to the MFP 101. The server 111 issues IP addresses, which are for use in wired LAN communications, to the MFP 101, the EFI 102, and the client PC 103.

It should be noted that in the present embodiment, the MFP 101 is connected only to the EFI 102 but may be connected to the LAN 105 as well as the EFI 102.

Figure 2A:
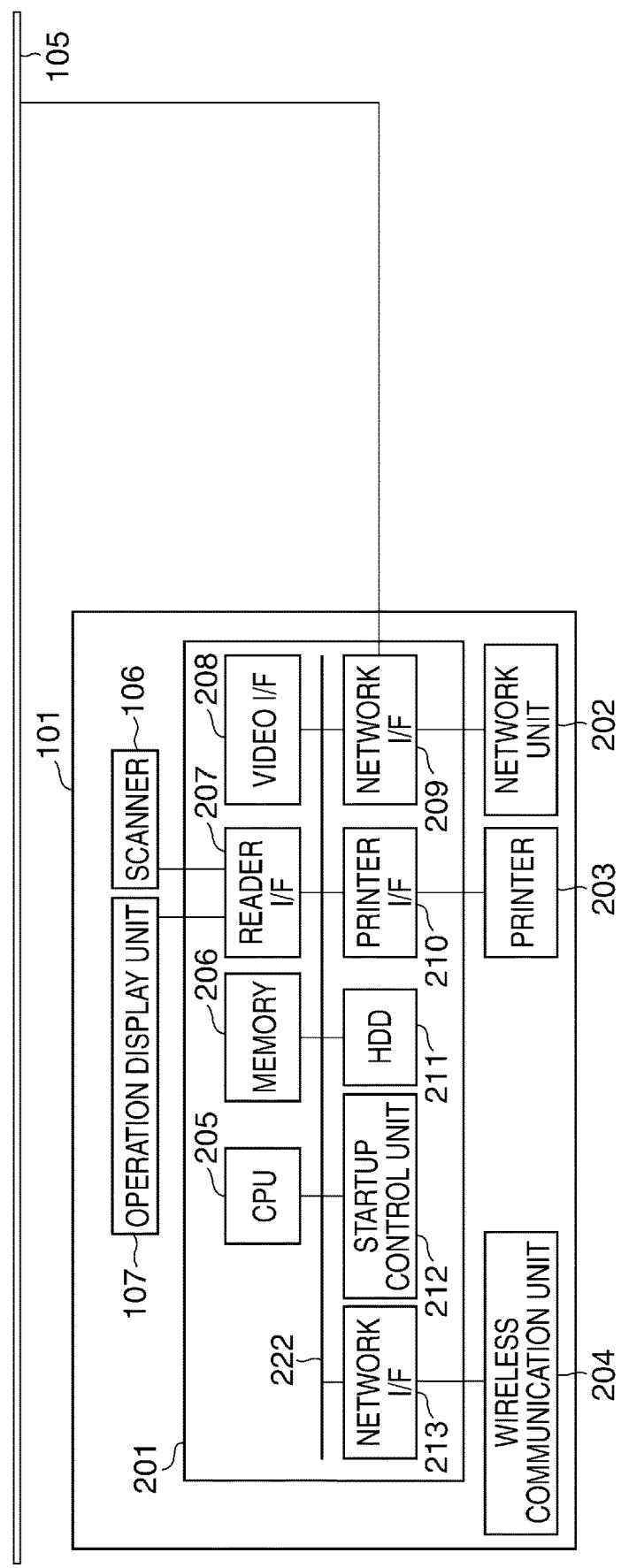
Figure 2B:
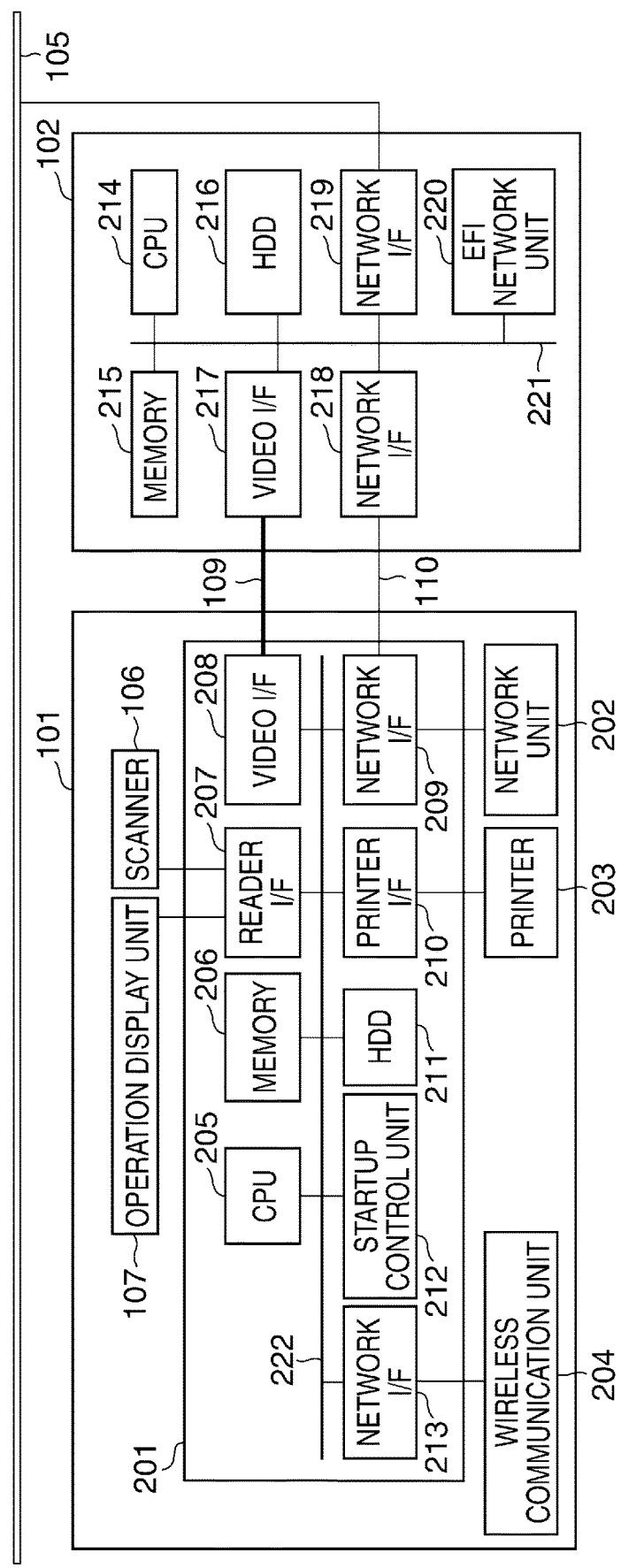

FIGS. 2A and 2B are block diagrams schematically showing internal arrangements of some component elements of the image forming systems 100 and 150 in FIGS. 1A and 1B, in which FIG. 2A is a block diagram schematically showing an internal arrangement of the MFP 101 in the image forming system 100 in FIG. 1A, and FIG. 2B is a block diagram schematically showing internal arrangements of the MFP 101 and the EFI 102 in the image forming system 150 in FIG. 1B.

The MFP 101 in FIGS. 2A and 2B has the scanner 106, the operation display unit 107, a controller unit 201, a network unit 202, a printer 203, and a wireless communication unit 204.

The controller unit 201 has a CPU 205 (a determination unit, a first changing unit, a second changing unit, a receiving unit), a memory 206, a reader I/F 207, a video I/F 208, a network I/F 209, and a printer I/F 210. The controller unit 201 has an HDD 211, a startup control unit 212, and a network I/F 213. The component elements of the controller unit 201 are connected to one another via a system bus 222. The scanner 106 and the operation display unit 107 are connected to the reader I/F 207, the printer 203 is connected to the printer I/F 210, and the wireless communication unit 204 is connected to the network I/F 213.

When the EFI 102 is not connected to the MFP 101, the network unit 202 is connected to the network I/F 209, and the client PC 103 and the sever 111 as well are connected to the network I/F 209 via the LAN 105. When the EFI 102 is connected to the MFP 101, a video I/F 217, to be described later, is connected to the video I/F 208 via the image video cable 109. Also, when the EFI 102 is connected to the MFP 101, the network unit 202 is connected to the network I/F 209, and a network I/F 218, to be described later, as well is connected to the network I/F 209 via the control cable 110.

When the EFI 102 is not connected to the MFP 101, the network unit 202 obtains an IP address (first address) (hereafter referred to as an "MFP/PC IP address"), which is for use in wired LAN communication between the MFP 101 and the client PC 103, from the server 111 and sets the obtained MFP/PC IP address in the MFP 101. When the EFI 102 is connected to the MFP 101, the network unit 202 obtains an IP address (third address) (hereafter referred to as an "MFP/EFI IP address"), which is for use in wired LAN communication between the MFP 101 and the EFI 102, from the server 111 and sets the obtained MFP/EFI IP address in the MFP 101.

As an IP address for use in wired LAN communication between the MFP 101 and the EFI 102, an MFP/EFI IP address is set in the MFP 101. However, wired LAN communication between the MFP 101 and the EFI 102 is not performed only by the MFP/EFI IP address. Specifically, in order for wired LAN communication between the MFP 101 and the EFI 102 to be performed, an IP address different from an MFP/EFI IP address and set in the EFI 102 (hereafter referred to as an "EFI/MFP IP address") is needed. When an MFP/EFI IP address and an EFI/MFP IP address correspond to each other, wired LAN communication between the MFP 101 and the EFI 102 is performed. It should be noted that an EFI/MFP IP address is set in the EFI 102 by an EFI network unit 220, to be described later.

Further, when an MFP/EFI IP address and an MFP/PC IP address are changed, the network unit 202 obtains a new MFP/EFI IP address and a new MFP/PC IP address from the server 111 and sets them in the MFP 101.

The printer 203 prints, for example, image data, which corresponds to an original read by the scanner 106, and PDL (page-description language) data, which is received from the client PC 103, on recording sheets. The wireless communication unit 204 issues an IP address (second address) (hereafter referred to as a "mobile terminal side IP address"), which is for use in wireless LAN communication between the MFP 101 and the mobile terminal 104 and sets the issued mobile terminal side IP address in the MFP 101. Also, when a mobile terminal side IP address is changed, the wireless communication unit 204 issues a new mobile terminal side IP address and sets it in the MFP 101.

The CPU 205 executes programs stored in the memory 206 and the HDD 211 to control the component elements of the MFP 101. The memory 206 is a work memory for the CPU 205. The HDD 211 is a large-capacity storage device and stores, for example, image data corresponding to an original read by the scanner 106 and PDL data received from the client PC 103. The HDD 211 also stores information on an MFP/EFI IP address, an MFP/PC IP address, and a mobile terminal side IP address set in the MFP 101. The information on each of the IP addresses includes a subnet mask which is a numerical value that discriminates between a network address and a host address constituting an IP address. Further, the HDD 211 stores changing IP addresses for use in changing an MFP/EFI IP address, an MFP/PC IP address, and a mobile terminal side IP address. Changing IP addresses are used to generate a MFP/EFI IP address, an MFP/PC IP address, and a mobile terminal side IP address that have been changed. The startup control unit 212 supplies power to the component elements of the MFP 101 and controls startup of the MFP 101.

The EFI 102 in FIG. 2B has a CPU 214, a memory 215, an HDD 216, a video I/F 217, network I/Fs 218 and 219, and the EFI network unit 220, and these component elements are connected to one another via a system bus 221. The client PC 103 and the server 111 are connected to the network I/F 219 via the LAN 105.

The CPU 214 executes programs stored in the memory 215 and the HDD 216 to control the component elements of the EFI 102. The memory 215 is a work memory for the CPU 214. The HDD 216 is a large-capacity storage device and stores, for example, image data that has been subjected to various types of processing by the EFI 102. The HDD 216 also stores information, for example, a subnet mask, on an EFI/MFP IP address and an IP address for use in wired LAN communication between the EFI 102 and the client PC 103 (fourth address) (hereafter referred to as an "EFI/PC IP address"). Further, when an EFI/MFP IP address and an EFI/PC IP address are to be changed, the HDD 216 stores changing IP addresses for use in generating an EFI/MFP IP address and an EFI/PC IP address.

The EFI network unit 220 obtains an EFI/MFP IP address and an EFI/PC IP address from the server 111 and sets them in the EFI 102. Also, when an MFP/EFI IP address set in the MFP 101 is changed, the EFI network unit 220 obtains a new EFI/MFP IP address from the server 111 and sets it in the EFI 102. This avoids a situation in which wired LAN communication between the MFP 101 and the EFI 102 is not performed.

When an EFI/PC IP address is set in the EFI 102, or when an EFI/PC IP address set in the EFI 102 is changed, the EFI 102 informs the client PC 103 accordingly.

Figure 3:
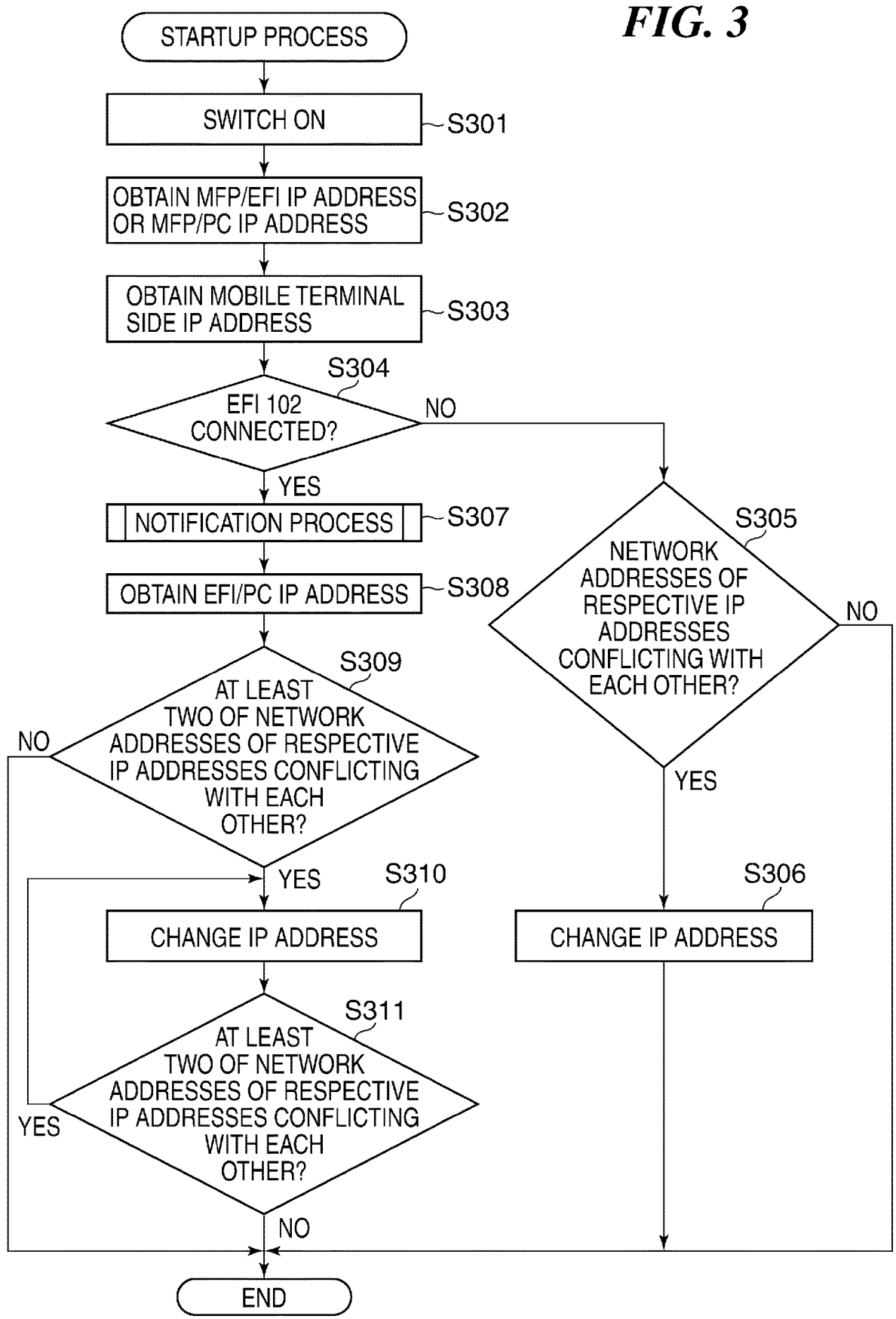
FIG. 3 is a flowchart showing the procedure of a startup process which is carried out by a CPU of the MFP in FIGS. 2A and 2B.

FIG. 3 is a flowchart showing the procedure of a startup process which is carried out by the CPU 205 of the MFP 101 in FIGS. 2A and 2B. The startup process in FIG. 3 is carried out on the precondition that an MFP/EFI IP address or an MFP/PC IP address and a mobile terminal side IP address are set in the MFP 101.

Referring to FIG. 3, first, when the MFP 101 is switched on (step S301), the CPU 205 obtains an MFP/EFI IP address or an MFP/PC IP address set in the MFP 101 (step S302). Next, the CPU 205 obtains a mobile terminal side IP address set in the MFP 101 (step S303) and determines whether or not the EFI 102 is connected to the MFP 101 (step S304).

As a result of the determination in the step S304, when the EFI 102 is not connected to the MFP 101, the CPU 205 determines whether or not a network address of the MFP/PC IP address and a network address of the mobile terminal side IP address conflict with each other (step S305). As described above, an IP address is comprised of a network address and a host address. The network address identifies a network space to which the IP address belongs, and the host address identifies a device in the network address. The network address and the host address are discriminated based on a subnet mask. In the step S305, by ascertaining whether or not the network address of the MFP/PC IP address and the network address of the mobile terminal side IP address conflict with each other, it is determined whether or not network spaces to which the respective IP addresses belong conflict with each other. As a result of the determination in the step S305, when the network address of the MFP/PC IP address and the network address of the mobile terminal side IP address do not conflict with each other, the CPU 205 normally starts the MFP 101 and terminates the present process. On the other hand, when the network address of the MFP/PC IP address and the network address of the mobile terminal side IP address conflict with each other, the CPU 205 changes the mobile terminal side IP address in priority to the MFP/PC IP address (step S306). For example, assume that the MFP/PC IP address is 192.168.1.100, and the mobile terminal side IP address is 192.168.1.200. Here, when a subnet mask of the mobile terminal side IP address is 255.255.255.0, the network address of the mobile terminal side IP address is 192.168.1. Therefore, the network address of the mobile terminal side IP address conflicts with the network address of the MFP/PC IP address. To resolve this conflict, the CPU 205 adds 1 to the end of the network address of the mobile terminal side IP address so that it can be 192.168.2. As a result, the conflict of the network addresses is resolved. After that, the CPU 205 normally starts the MFP 101 and terminates the present process.

When an MFP/PC IP address is changed, the server 111 issues a new MFP/PC IP address and sets this new MFP/PC IP address in the MFP 101. On the other hand, when a mobile terminal side IP address is changed, the MFP 101 itself issues a new mobile terminal side IP address and sets this new mobile terminal side IP address in the MFP 101. Specifically, changing of an MFP/PC IP address is not completed only by the MFP 101, whereas changing of a mobile terminal side IP address is completed only by the MFP 101, and therefore, the mobile terminal side IP address is changed more easily than the MFP/PC IP address is. Accordingly, in the present embodiment, changing of a mobile terminal side IP address is given higher priority than changing of an MFP/PC IP address in the step S306 as described above.

As a mobile terminal side IP address after it is changed, either a changing IP address stored in advance in the HDD 211 may be used as it is, or an IP address input by the user may be used.

As a result of the determination in the step S304, when the EFI 102 is connected to the MFP 101, the CPU 214 of the EFI 102 carries out a notification process (FIG. 4), to be described later, in which it notifies the MFP 101 of an EFI/PC IP address (step S307). The CPU 205 then obtains the EFI/PC IP address (step S308). The CPU 205 determines whether or not at least two network addresses among a network address of the MFP/EFI IP address, the network address of the mobile terminal side IP address, and a network address of the EFI/PC IP address conflict with each other (step S309).

As a result of the determination in the step S309, when the network addresses are different from one another, the CPU 205 normally starts the MFP 101 and terminates the present process. On the other hand, when at least two of the network addresses conflict with each other, the CPU 205 changes at least one of IP addresses corresponding to the competing network addresses (step S310). It should be noted that each IP address is changed in the same manner as in the step S306 described above.

When a mobile terminal side IP address is changed, the MFP 101 issues a new mobile terminal side IP address and sets this new mobile terminal side IP address in the MFP 101. On the other hand, when an MFP/EFI IP address is changed, a new MFP/EFI IP address issued by the server 111 is set in the MFP 101. When the new MFP/EFI IP address is set in the MFP 101, a new EFI/MFP IP address corresponding to the new MFP/EFI IP address is issued by the server 111. The new EFI/MFP IP address thus issued is set in the EFI 102. An EFI/PC IP address is changed in the same manner that an MFP/EFI IP address is changed, and in this case, the EFI 102 needs to have the client PC 103 recognize that the EFI/PC IP address has been changed.

Specifically, changing of an MFP/EFI IP address or an EFI/PC IP address is not completed only by the MFP 101, whereas changing of a mobile terminal side IP address is completed only by the MFP 101. Thus, changing of a mobile terminal side IP address is easier than changing of an EFI/MFP IP address or an EFI/PC IP address. Also, changing of an MFP/EFI IP address is completed by only the server 111, the MFP 101, and the EFI 102, whereas changing of an EFI/PC IP address needs not only the server 111, the MFP 101, and the EFI 102 but also the client PC 103. Thus, changing of an MFP/EFI IP address easier than changing of an EFI/PC IP address. Accordingly, in the present embodiment, changing of a mobile terminal side IP address is given higher priority than changing of an MFP/EFI IP address and an EFI/PC IP address in the step S310. Also, changing of an MFP/EFI IP address is given higher priority than changing of an EFI/PC IP address.

Specifically, when a network address of an MFP/EFI IP address and a network address of a mobile terminal side IP address conflict with each other, changing of the mobile terminal side IP address is given higher priority than changing of the MFP/EFI IP address. When a network address of an EFI/PC IP address and a network address of a mobile terminal side IP address conflict with each other, changing of the mobile terminal side IP address is given higher priority than changing of the EFI/PC IP address. When a network address of an EFI/PC IP address and a network address of an MFP/EFI IP address conflict with each other, changing of the MFP/EFI IP address is given higher priority than changing of the EFI/PC IP address. When a network address of an MFP/EFI IP address, a network address of a mobile terminal side IP address, and a network address of an EFI/PC IP address conflict with one another, the mobile terminal side IP address is changed first, and the MFP/EFI IP address is changed next.

In the next step S311, the CPU 205 determines again whether or not at least two network addresses among the network address of the MFP/EFI IP address, the network address of the mobile terminal side IP address, and the network address of the EFI/PC IP address conflict with each other. When the CPU 205 determines in the step S311 that at least two of the network addresses still conflict with each other, the process returns to the step S310. On the other hand, when the network addresses are different, the CPU 205 terminates the present process.

Figure 4:
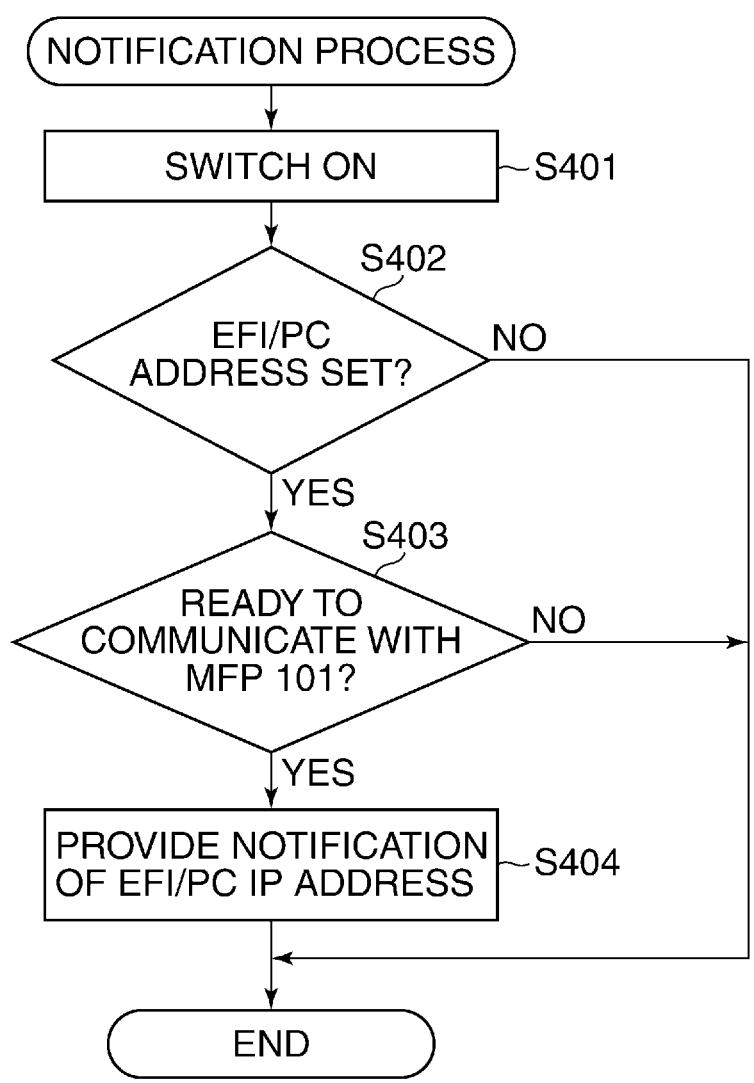
FIG. 4 is a flowchart showing the procedure of a notification process which is carried out in step S308 in FIG. 3.

FIG. 4 is a flowchart showing the procedure of the notification process which is carried out in the step S308 in FIG. 3. The process in FIG. 4 is carried out by the CPU 214 of the EFI 102 in FIG. 2B.

Referring to FIG. 4, first, when the EFI 102 is switched on (step S401), the CPU 214 determines whether or not an EFI/PC IP address is set in the EFI 102 (step S402). As a result of the determination in the step S402, when no EFI/PC IP address is set in the EFI 102, the CPU 214 terminates the present process. On the other hand, when an EFI/PC IP address is set in the EFI 102, the CPU 214 determines whether or not the EFI 102 is able to communicate with the MFP 101 (step S403). As a result of the determination in the step S403, when the EFI 102 is not able to communicate with the MFP 101, the CPU 214 terminates the present process. On the other hand, when the EFI 102 is able to communicate with the MFP 101, the CPU 214 notifies the MFP 101 of the EFI/PC IP address set in the EFI 102 (step S404) and terminates the present process.

According to the process in FIG. 3, in the image forming system 100 (NO in the step S304), a network address of an MFP/PC IP address and a network address of a mobile terminal side IP address may conflict with each other (YES in the step S305). In this case, the mobile terminal side IP address is changed (step S306). This prevents a network address of an MFP/PC IP address and a network address of a mobile terminal side IP address from conflicting with each other. Also, in the image forming system 150 (YES in the step S304), when at least two network addresses among a network address of an MFP/EFI IP address, a network address of a mobile terminal side IP address, and a network address of an EFI/PC IP address conflict with each other (YES in the step S309), at least one of IP addresses corresponding to the competing network addresses is changed (step S310). This makes the network addresses of the MFP/EFI IP address, the mobile terminal side IP address, and the EFI/PC IP address differ from one other. This avoids a situation in which both a wired LAN communication between the MFP 101 and the client PC 103 and a wireless LAN communication between the MFP 101 and the mobile terminal 104 are possible. Moreover, a situation in which all of a wired LAN communication between the MFP 101 and the EFI 102, a wired LAN communication between the EFI 102 and the client PC 103, and a wireless LAN communication between the MFP 101 and the mobile terminal 104 are possible is avoided. As a result, the MFP 101 properly carries out communication with the EFI 102, the client PC 103, and the mobile terminal 104.

Moreover, according to the process in FIG. 3, when a network address of an MFP/PC IP address and a network address of a mobile terminal side IP address conflict with each other, changing of the mobile terminal side IP address is given higher priority than changing of the MFP/PC IP address. As described above, changing of an MFP/PC IP address is not completed by only the MFP 101. On the other hand, changing of a mobile terminal side IP address is completed by only the MFP 101. Therefore, giving higher priority to changing of a mobile terminal side IP address than to changing of a MFP/PC IP address easily makes the MFP/PC IP address and the mobile terminal side IP address differ from each other.

Further, according to the process in FIG. 3, changing of a mobile terminal side IP address is given higher priority than changing of an MFP/EFI IP address and an EFI/PC IP address. Changing of an MFP/EFI IP address is given higher priority than changing of an EFI/PC IP address. As described above, changing of an MFP/EFI IP address and an EFI/PC IP address is not completed by only the MFP 101. On the other hand, changing of a mobile terminal side IP address is completed by only the MFP 101, and changing of an MFP/EFI IP address is completed by only the server 111, the MFP 101, and the EFI 102. Changing of an EFI/PC IP address needs not only the server 111, the MFP 101, and the EFI 102 but also the client PC 103. Thus, changing of a mobile terminal side IP address is easier than changing of an MFP/EFI IP address, and changing of an MFP/EFI IP address is easier than changing of an EFI/PC IP address. Namely, in the process in FIG. 3, an address that is easy to change is changed with the highest priority, and this easily makes a mobile terminal side IP address, an MFP/EFI IP address, and an EFI/PC IP address differ from each other.

Figure 5:
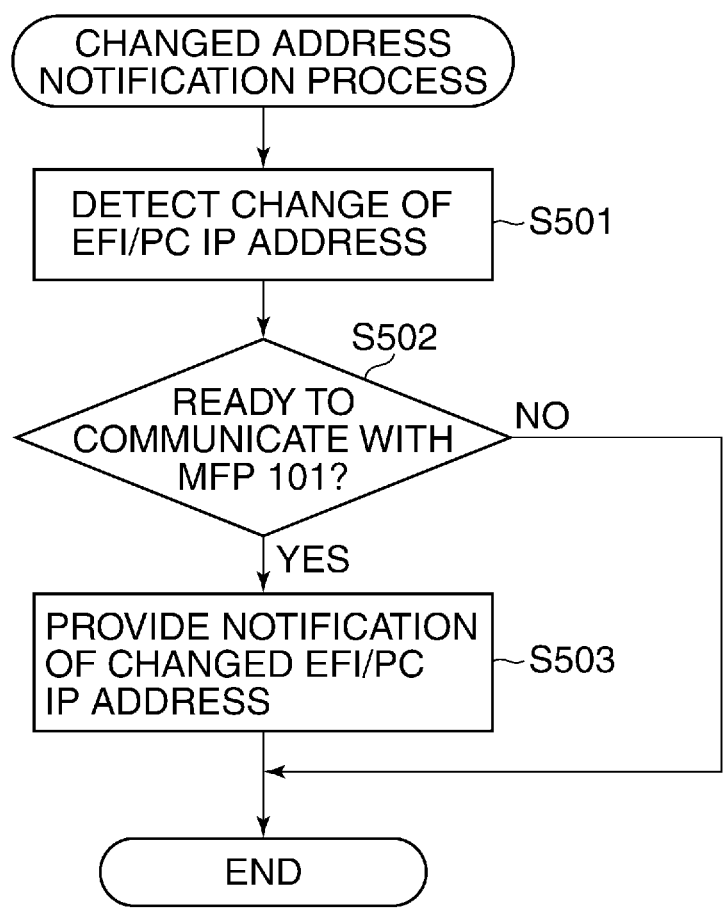
FIG. 5 is a flowchart showing the procedure of a changed-address notification process in which an EFI/PC IP address set in the EFI in the image forming system after completion of the startup process in FIG. 3 is changed, and the MFP is notified of the changed EFI/PC IP address.

FIG. 5 is a flowchart showing the procedure of a changed-address notification process. In the process in FIG. 5, an EFI/PC IP address set in the EFI 102 in the image forming system 150 after completion of the startup process in FIG. 3 is changed, and the MFP 101 is notified of the changed EFI/PC IP address. The process in FIG. 5 is carried out by the CPU 214 of the EFI 102.

Referring to FIG. 5, first, the CPU 214 detects that an EFI/PC IP address set in the EFI 102 has been changed (step S501) and determines whether or not the EFI 102 is able to communicate with the MFP 101 (step S502). As a result of the determination in the step S502, when the EFI 102 is not able to communicate with the MFP 101, the CPU 214 terminates the present process. On the other hand, when the EFI 102 is able to communicate with the MFP 101, the CPU 214 sends a notification of the changed EFI/PC IP address to the CPU 205 of the MFP 101 and terminates the present process.

Figure 6:
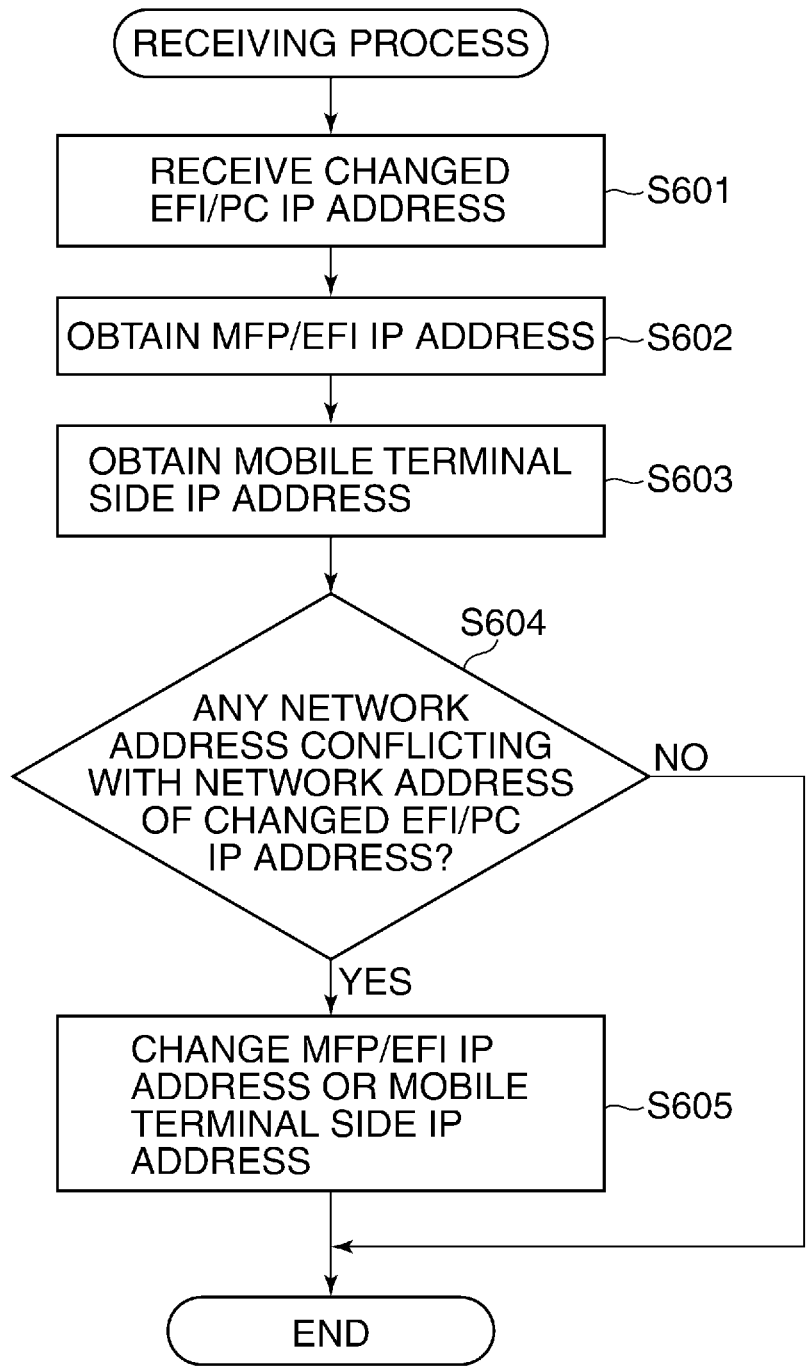
FIG. 6 is a flowchart showing the procedure of a receiving process in which the MFP receives the changed EFI/PC IP address, a notification of which was provided in step S503 in FIG. 5.

FIG. 6 is a flowchart showing the procedure of a receiving process in which the MFP 101 receives the changed EFI/PC IP address the notification of which was sent in the step S503 in FIG. 5. The process in FIG. 6 is carried out by the CPU 205 of the MFP 101.

Referring to FIG. 6, first, the CPU 205 receives the changed EFI/PC IP address from the EFI 102 (step S601). Next, the CPU 205 obtains an MFP/EFI IP address set in the MFP 101 (step S602) and obtains a mobile terminal side IP address set in the MFP 101 (step S603). Then, the CPU 205 determines whether or not a network address of the changed EFI/PC IP address conflicts with a network address of the MFP/EFI IP address or a network address of the mobile terminal side IP address (step S604).

Figure 7:
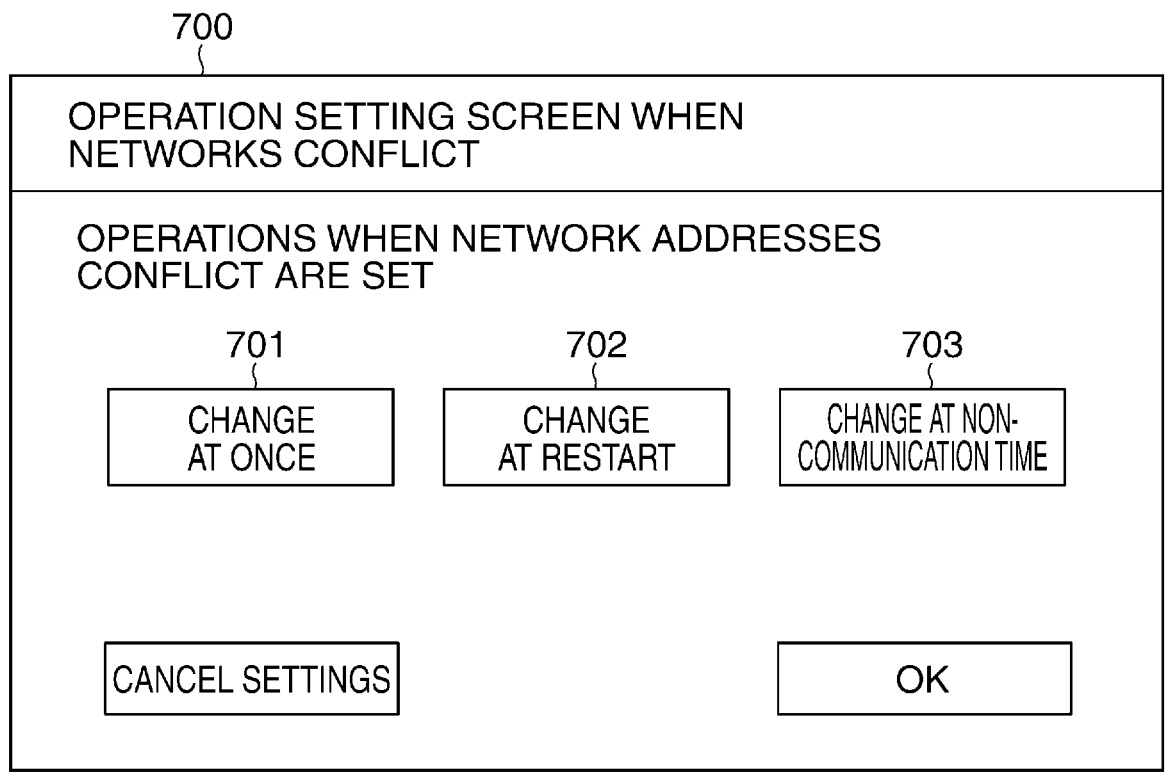
FIG. 7 is a view useful in explaining a setting screen used to set the timing for changing an IP address for the MFP in FIGS. 1A and 1B.

As a result of the determination in the step S604, when the network address of the changed EFI/PC IP address conflicts with neither the network address of the MFP/EFI IP address nor the network address of the mobile terminal side IP address, the CPU 205 terminates the present process. On the other hand, when the CPU 205 determines that the network address of the changed EFI/PC IP address conflicts with the network address of the MFP/EFI IP address or the network address of the mobile terminal side IP address, the process proceeds to step S605. In the step S605, the CPU 205 changes the mobile terminal side IP address in priority to the changed EFI/PC IP address with the timing set in advance in the MFP 101 through a setting screen (FIG. 7) (setting unit). After that, the CPU 205 terminates the present process. It should be noted that each IP address is changed in the same manner as in the step S310 described above.

The setting screen 700 has a change-at-once button 701, a change-at-restart button 702, and a change-at-non-communication-time button 703. When the change-at-once button 701 is selected, an MFP/EFI IP address or a mobile terminal side IP address is changed at a predetermined time point. It should be noted that the predetermined time point is, for example, a time point at which it is determined that a network address of a new EFI/PC IP address after it is changed conflicts with a network address of either an MFP/EFI IP address or a mobile terminal side IP address. When the change-at-restart button 702 is selected, an MFP/EFI IP address or a mobile terminal side IP address is changed when the MFP 101 is restarted next, and when the startup process described above is carried out. When the change-at-non-communication-time button 703 is selected, an MFP/EFI IP address or a mobile terminal side IP address is changed when the MFP 101 is communicating with neither the EFI 102 nor the mobile terminal 104.

According to the process in FIG. 6, a changed EFI/PC IP address is received from the EFI 102 (step S601). Then, a network address of the changed EFI/PC IP address may conflict with a network address of an MFP/EFI IP address or a network address of a mobile terminal side IP address. In this case, the MFP/EFI IP address or the mobile terminal side IP address is changed (step S605). As described above, changing of an EFI/PC IP address is not easier than changing of an MFP/EFI IP address or a mobile terminal side IP address. Thus, after an EFI/PC IP address is changed, an MFP/EFI IP address or a mobile terminal side IP address is changed to prevent an EFI/PC IP address, which takes time and effort to change, from being changed twice.

Figure 8:
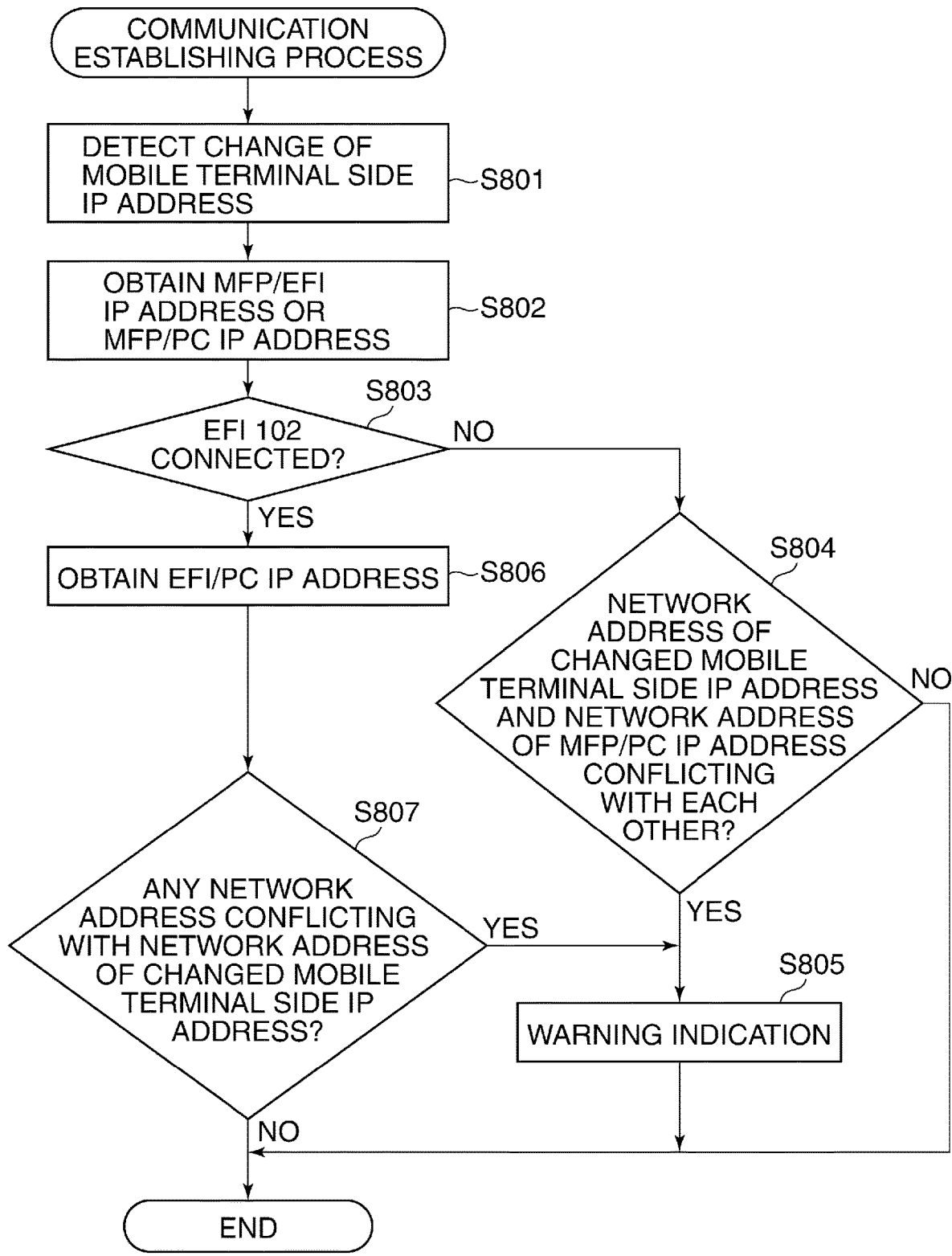
FIG. 8 is a flowchart showing the procedure of a communication establishing process which is carried out when a mobile terminal side IP address is to be changed after completion of the startup process in FIG. 3.

FIG. 8 is a flowchart showing the procedure of a communication establishing process which is carried out when a mobile terminal side IP address is changed after the startup process in FIG. 3 is completed. The process in FIG. 8 is carried out by the CPU 205 of the MFP 101.

Figure 9A:
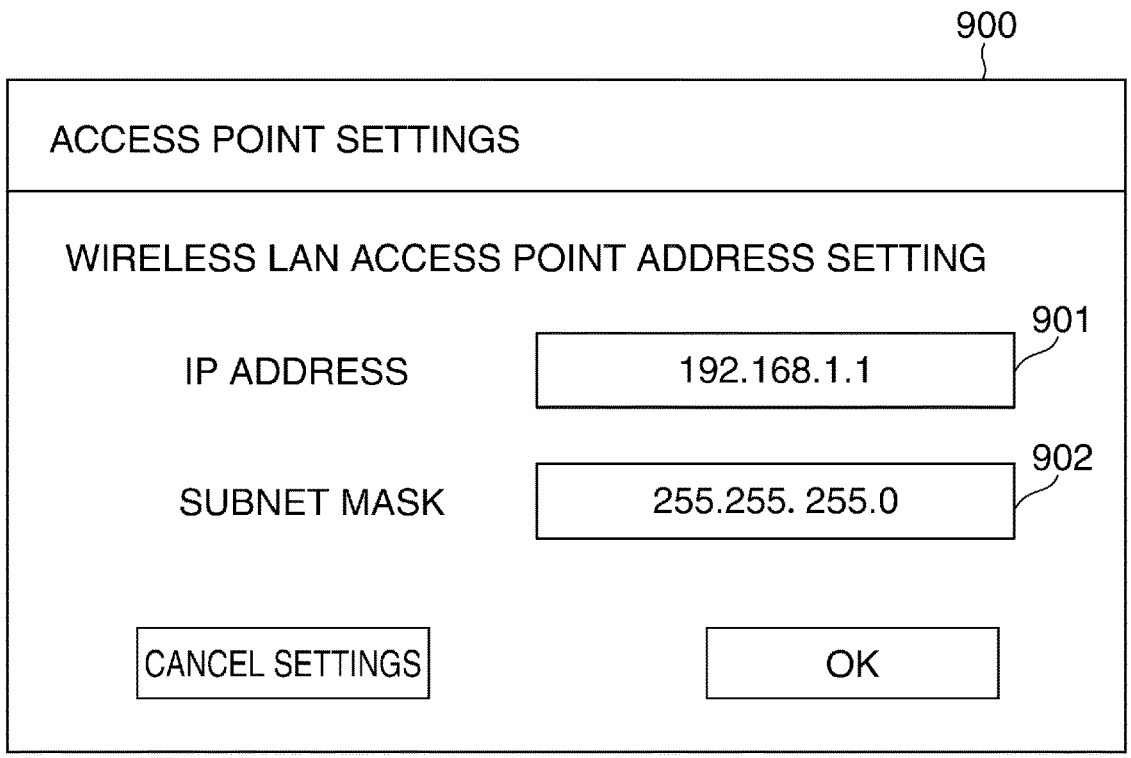
FIGS. 9A and 9B are views useful in explaining an access point setting screen and a warning indication displayed on an operation display unit in FIGS. 1A and 1B.

Referring to FIG. 8, first, the CPU 205 detects that a mobile terminal side IP address has been changed (step S801). As the mobile terminal side IP address, for example, a new IP address or the like is input via an access point setting screen 900 (FIG. 9A) displayed on the operation display unit 107. The mobile terminal side IP address is changed by setting the input new IP address or the like as a mobile terminal side IP address in the MFP 101. The access point setting screen 900 has an IP address input field 901 and a subnet mask input field 902. A new IP address is entered into the IP address input field 901, and a subnet mask is entered into the subnet mask input field 902.

Figure 9B:
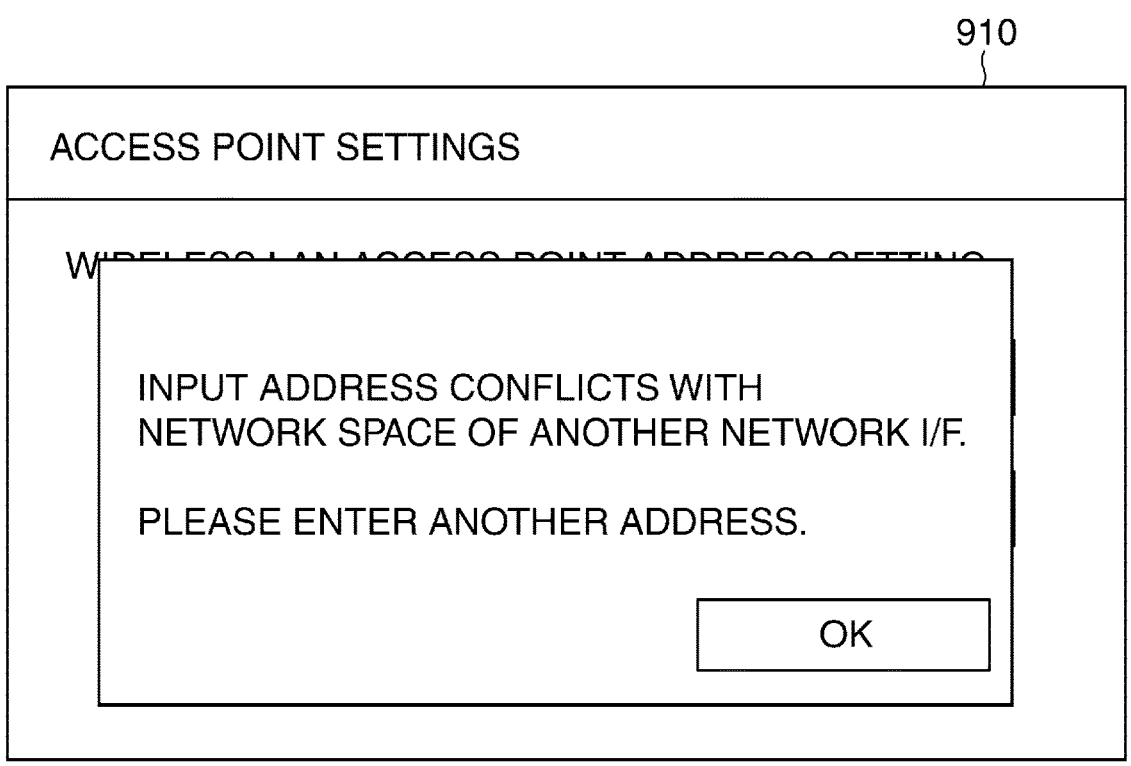

Referring to again FIG. 8, the CPU 205 obtains an MFP/EFI IP address or an MFP/PC IP address set in the MFP 101 (step S802) and determines whether or not the EFI 102 is connected to the MFP 101 (step S803). As a result of the determination in the step S803, when the EFI 102 is not connected to the MFP 101, the CPU 205 determines whether or not a network address of the changed mobile terminal side IP address and a network address of the MFP/PC IP address conflict with each other (step S804). As a result of the determination in the step S804, when the network address of the changed mobile terminal side IP address and the network address of the MFP/PC IP address do not conflict with each other, the CPU 205 terminates the present process. On the other hand, when the network address of the changed mobile terminal side IP address and the network address of the MFP/PC IP address conflict with each other, the CPU 205 produces a warning indication 910 (FIG. 9B) on the operation display unit 107 (step S805) and terminates the present process. The warning indication 910 requests entry of a new IP address or the like on the access point setting screen 900 again.

As a result of the determination in the step S803, when the EFI 102 is connected to the MFP 101, the CPU 205 obtains an EFI/PC IP address (step S806). The CPU 205 then determines whether or not the network address of the changed mobile terminal side IP address conflicts with the network address of the MFP/PC IP address or a network address of the EFI/PC IP address (step S807). As a result of the determination in the step S807, when the network addresses are different, the CPU 205 terminates the present process. On the other hand, when the CPU 205 determines that the network address of the changed mobile terminal side IP address conflicts with the network address of the MFP/PC IP address or the network address of the EFI/PC IP address, the process proceeds to the step S805.

According to the process in FIG. 8, in the image forming system 150 (YES in the step S803), a network address of a changed mobile terminal side IP address conflicts with a network address of an MFP/PC IP address or a network address of an EFI/PC IP address. In this case (YES in the step S807), the warning indication 910 is produced on the operation display unit 107 (step S805). As a result, the user recognizes that proper communication with the EFI 102, the client PC 103, or the mobile terminal 104 constituting the image forming system 150 is impossible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-087664, filed Apr. 22, 2015 and No. 2016-032961, filed Feb. 24, 2016 which are hereby incorporated by reference herein in their entirety.

What is claimed is:

1. A printing system including a printing control apparatus which performs a control on printing and an image forming apparatus which forms an image on a sheet and is connected via a LAN cable to the printing control apparatus,
wherein the image forming apparatus comprising:
a first network interface connected to the LAN cable; and
a second network interface,
wherein the printing control apparatus comprising:
a third network interface connected to the LAN cable; and
a fourth network interface to which an IP address used for connecting to a first network is allocated, and
wherein the image forming apparatus obtains an IP address used for communication with outside via the first network interface from the printing control apparatus, receives user operation to input a candidate IP address to be used by the second network interface, determines whether or not to notify to a user based on at least the obtained IP address and the input candidate IP address, and notifies predetermined information to the user in a case where it is determined to notify to the user, and
wherein the predetermined information is information of promoting re-entering of a candidate IP address to be used by the second network interface.

2. An image forming apparatus which forms an image on a sheet and is connected via a LAN cable to a printing control apparatus, the printing control apparatus having a third network interface connected to the LAN cable and a fourth network interface to which an IP address used for connecting to a specific network is allocated, the image forming apparatus comprising:
a first network interface connected to the LAN cable to communicate with the third network interface;
a second network interface;
at least one memory that stores a set of instructions; and
at least one processor that executes the instructions, the instructions, when executed, causing the image forming apparatus to perform operations comprising:
obtaining an IP address used for communication with outside via the first network interface;
receiving user operation to input a candidate IP address to be used by the second network interface;
determining whether or not to notify to a user based on at least the obtained IP address and the input candidate IP address; and
notifying predetermined information to the user in a case where it is determined to notify to the user,
wherein the predetermined information is information of promoting re-entering of a candidate IP address to be used by the second network interface.

3. The image forming apparatus according to claim 2, wherein the predetermined information is notified in response to occurrence of conflict between a first network address portion which is identified by using a subnet mask in the input candidate IP address and a second network address portion which is identified by using a subnet mask in the obtained IP address.

4. The image forming apparatus according to claim 2, wherein the IP address used for communication with the outside via the first network interface is obtained from the printing control apparatus.

5. The image forming apparatus according to claim 4, wherein the obtained IP address is an IP address allocated to the fourth network interface of the printing control apparatus.

6. The image forming apparatus according to claim 2, further comprising a print device,
wherein the operations further comprises
controlling the print device to print image data based on data obtained from the printing control apparatus or an external terminal.

7. The image forming apparatus according to claim 2, wherein the predetermined information is displayed on a display of the image forming apparatus.

8. The image forming apparatus according to claim 2, wherein the predetermined information includes information of a warning message.

* * * * *